United States Patent Office 3,054,328
Patented Sept. 18, 1962

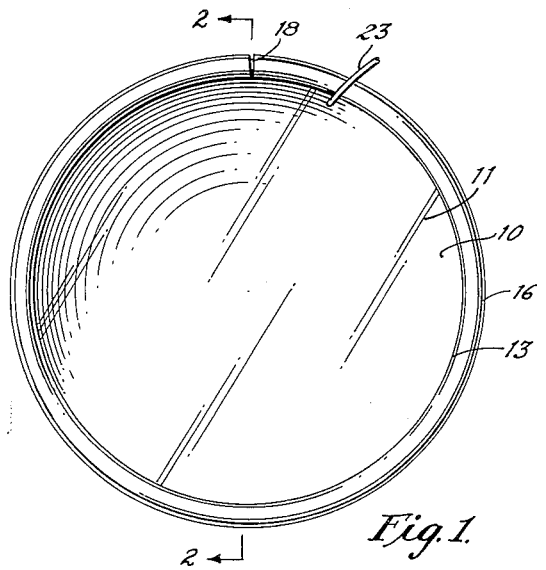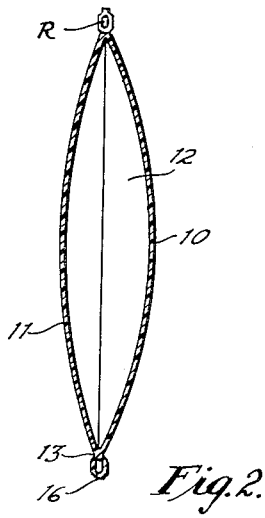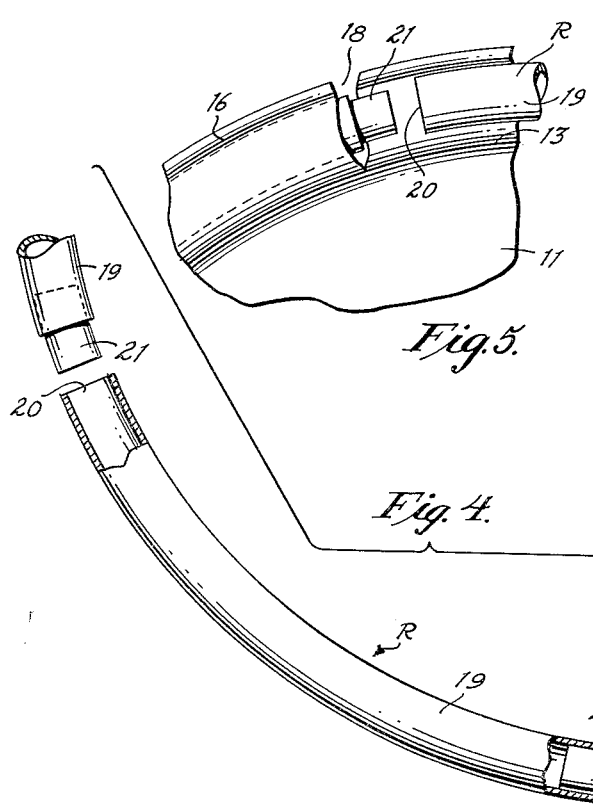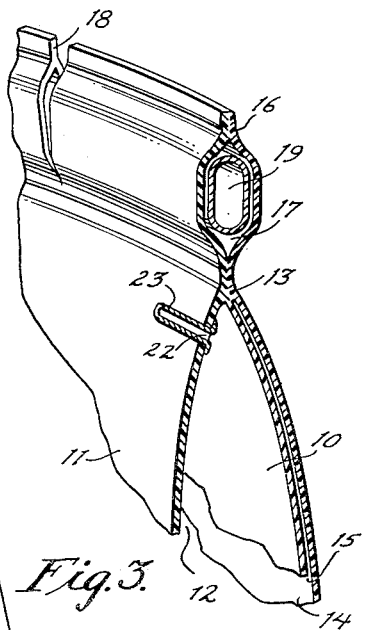
INVENTOR.
JOHN RODGERS
BY Robertson and Youtie
ATTORNEYS.

3,054,328
INFLATABLE CURVED MIRROR
John Rodgers, Trevose, Pa., assignor of one-third to George Gordon and one-third to Glentworth D. Webb, both of Philadelphia, Pa.
Filed Dec. 23, 1958, Ser. No. 782,436
3 Claims. (Cl. 88—73)

The present invention relates to curved mirrors commonly identified as concave-convex, depending on which side is the reflecting surface, and is concerned primarily with a mirror that receives its curved characteristics by inflation.

The invention has in view as its foremost objective the provision of an inflatable curved mirror which comprises essentially a circular supporting ring, a circular sheet of a pliant resilient plastic having one surface coated with a reflecting metal, and a circular sheet of a transparent plastic, with the two sheets having their peripheral edges anchored to the supporting ring, together with means for supplying air under pressure between the two sheets so as to inflate them and impart a curvature to the sheet having the reflecting surface.

In providing a mirror in accordance with the above-noted object, it is important that the device be susceptible of assembly and disassembly. Thus a further object in view is to provide an inflatable curved mirror of the type indicated in which the two plastic sheets are sealed together along spaced lines at the periphery. The two lines of joinder define a chamber that is adapted to receive a sectional supporting ring. Thus the two sheets of plastic between the seal seams define what is in effect a tube which may be slitted at an appropriate point to permit the insertion thereinto of the several sections of a sectional supporting ring.

Another somewhat more detailed object of the invention is to provide, in an inflatable mirror of the type noted, a sectional supporting ring comprising a plurality of tubular sections of substantially equal length and each of which has at one end a reduced portion that is adapted to be received in the open end of the next adjacent section.

In order to provide a mirror of the type indicated which will meet with conditions of practical usage, it is deemed desirable to provide additional protection for the reflecting sheet. Thus another object in view is to provide, in an inflatable mirror of the type indicated, an auxiliary circular sheet of plastic that is arranged exteriorly of the reflecting sheet and which has its peripheral edge anchored to the supporting ring. A certain amount of air will always be entrapped between this auxiliary sheet and the reflecting sheet. Thus, when the pressure chamber is inflated, this entrapped air provides a good protective cushion for the reflecting sheet.

Still another object in view is to provide, in an inflatable curved mirror of the type noted, a transparent flexible sheet of plastic which is formed at a point adjacent to the supporting ring with an opening with which is associated a one-way check valve in order to facilitate inflation of the pressure chamber.

Various other more detailed objects and advantages of the invention, such as arise in connection with carrying out the above-noted ideas in a practical embodiment, will in part become apparent and in part be hereinafter stated as the description of the invention proceeds.

The invention therefore comprises an inflatable curved mirror which consists essentially of a sectional supporting ring, a reflecting sheet of a pliant resilient plastic, a transparent sheet of plastic which cooperates with the reflecting sheet to define a pressure chamber, an auxiliary protective sheet of plastic on the exterior of the reflecting sheet, with the several sheets being sealed along spaced circular lines at the periphery to define a tubelike chamber which receives the sectional supporting ring, together with means for inflating the pressure chamber.

For a full and more complete understanding of the invention, reference may be had to the following description and accompanying drawing, wherein:

FIGURE 1 is a view in front elevation of an inflatable curved mirror designed in accordance with the precepts of this invention;

FIGURE 2 is a transverse vertical section taken about on the plane represented by the line 2—2 of FIGURE 1;

FIGURE 3 is a detailed perspective taken on an enlarged scale illustrating the several plastic sheets in section;

FIGURE 4 is another detail taken on an enlarged scale showing certain sections of the supporting ring in exploded relation; and FIGURE 5 is a detail of a portion of the mirror at the peripheral edge, with the tube which houses the sectional supporting ring broken away.

It is to be clearly understood that the present invention is susceptible of adoption in either a concave or convex mirror. It is believed that a concave mirror has a broader field of use, and the invention will therefore be described in conjunction with a concave mirror.

However, it is to be noted that the principles of this invention might be adopted for a convex mirror, in which case the exterior surface of the pliant resilient reflecting sheet is coated with the reflecting metal rather than the inner surface. Moreover, in such instances, the plastic sheet which cooperates with the reflecting sheet in defining the pressure chamber need not be transparent, although if an auxiliary protective sheet is employed it should be transparent.

Referring now to the drawing, wherein like reference characters denote corresponding parts, the invention in its simplest form is illustrated in FIGURES 1 and 2. The mirror therein depicted comprises a reflecting sheet 10, the inner surface of which has a coating of metal applied thereto, as by a well-known vacuum process; and this metal may be aluminum, silver, or any other metal having good reflecting properties and which is susceptible of being applied by the vacuum process. The sheet 10 itself is of a pliant resilient plastic that is characterized as having a smooth surface. The product now being produced by the Du Pont Company and identified as Mylar is a good example of such a plastic. Among others might be noted cellophane and polyethylene.

A sheet of transparent plastic is designated 11; and this sheet, like the sheet 10, is circular and of the same size. This sheet 11 may be of any well-known transparent plastic having the required properties of pliancy, resiliency, and transparency. There are many cellulose acetates which meet these requirements. The sheets 10 and 11 have their peripheral edges anchored to a supporting ring, which is referred to generally by the reference character R, and together define a pressure chamber 12. It is evident that by properly controlling any difference in thickness between sheets 10 and 11 a desired curvature may be imparted to the reflecting sheet 10. Thus it may be stated as a general rule that the transparent sheet 11 will be thicker or heavier than the sheet 10, so that when air under pressure is applied to the chamber 12 the reflecting sheet 10 will be imparted a curvature greater than the transparent sheet 11. This is clearly indicated in FIGURE 2.

In the refined form of the invention which is illustrated in FIGURE 3, the transparent sheet is shown at 11 and the reflecting sheet at 10. The peripheral edges of the two are heat-sealed together along a line represented at 13 which, it will be noted, is spaced inwardly from the peripheral edge of the sheet 11. An auxiliary protective sheet 14 is provided on the exterior of the reflecting sheet 10, with an airspace 15 between the two. This sheet 15 is also heat-sealed to the sheet 11 along the seam at 13, and also at the peripheral edges as indicated at 16. Thus, those portions of the sheets 11 and 14 between the seams 13 and 16 define a tubelike space 17 which receives the supporting ring R. Thus the housing of the space 17 is split as represented at 18 to provide access to the space 17.

The supporting ring R comprises a plurality of tubular sections 19 which may be generally circular in cross section, but preferably oval as illustrated in FIGURE 3. Each section 19 has an open end or mouth 20 at one end and carries a reduced extension 21 at the other which is adapted to be received in the open mouth 20 of the next adjacent section. While it might be entirely practical to form this reduced extension 21 as an integral part of each section, it is believed more practical to form this member as a separate element which is simply inserted into that end of the section by a pressed fit, as depicted in FIGURE 4.

It is evident that one section 19 of the ring R may be inserted into the space 17 through the slit 18, and then the next section with the joiner between a reduced extension 21 and open mouth 20 being established as each section is inserted.

Obviously, it is necessary to provide means for applying air under pressure to the pressure chamber 12 so as to inflate the sheets 10 and 11. While this means is susceptible of many embodiments, as illustrated in the drawing the transparent sheet 11 is shown as formed with a port at 22 with which is associated a fitting 23 that ordinarily will include a releasable check valve. Thus, air under pressure is delivered through the port 22 to the pressure chamber 12, past the check valve, and is maintained in the pressure chamber until the check valve is released in a well-known manner.

*Operation*

While the manner of assembling and disassembling the inflatable curved mirror of this invention, as well as its mode of usage, are believed to be obvious from the illustration of the drawing and description of parts given, they may be briefly outlined as follows:

It will first be assumed that the device is entirely disassembled. Thus the several sections 19 are separate and the several plastic sheets are deflated, in which state they may be folded up into a compact formation.

When the mirror is to be assembled for use, a section 20 is inserted into the space 17 through the slit 18. Another section is then inserted and the joinder with the previously inserted section completed by causing the extension 21 on the one section to be received in the mouth 20 of the next adjacent section. This operation is repeated until all the sections 19 have been inserted into the space 17 and the structure of the supporting ring R completed. Air under pressure from any appropriate source is now applied to the fitting 23. The source may be a pump, or even the lips of a user. In any case, air is delivered to the pressure chamber 12 to inflate the sheets 10 and 11 into the position depicted in FIGURES 2 and 3.

This inflation, of course, imparts a desired curvature to the reflecting sheet 12; and this curvature is controlled by the degree of inflation.

As this action takes place, the air that is entrapped in the space 15 is also compressed so as to provide a good protective cushion on the exterior of the reflecting sheet 10.

The mirror is now in condition for use and may be employed for any desired purpose, although the invention has particularly in mind the harnessing of solar heat. The structure above described is particularly adaptable to mirrors of large size, such as one four feet in diameter; and the large area of such a mirror will generate a high degree of heat.

When it is desired to disassemble the mirror, all that is required is to release the check valve at the port 22 to relieve the pressure in the chamber 12. The sections 19 of the supporting ring R are then removed from the space 17, whereupon the device may be stored away in a compact state.

While a preferred specific embodiment of the invention is hereinbefore set forth, it is to be clearly understood that the invention is not to be limited to the exact materials, constructions, and designs illustrated and described, because various modifications of these details may be provided in putting the invention into practice within the purview of the appended claims.

What is claimed is:

1. In an inflatable curved mirror, a pair of circular complemental sheets of pliant resilient plastic sealed together at their peripheral edges and along a circular line spaced from their peripheral edges, said sheets being slitted between said seals to provide access to said space, a sectional supporting ring comprising a plurality of rigid arcuate sections each of which is adapted to be inserted through said slit into said space with the meeting ends of said sections being provided with male and female elements of a detachable joint, the inner face of one of said sheets being coated with a reflecting metal, the other of said sheets being transparent, said sheets cooperating to define a pressure chamber, and means for supplying air under pressure to said chamber to inflate said sheets, whereby the peripheral contracting action of said sheets under pressure maintains said joint elements engaged.

2. In an inflatable curved mirror, a pair of circular complemental sheets of pliant resilient plastic sealed together at their peripheral edges and along a circular line spaced from their peripheral edges, said sheets being slitted between said seals to provide access to said space, a sectional supporting ring comprising a plurality of rigid arcuate tubular sections each having an open mouth at one end and a reduced extension at the other with the reduced extension on one section being adapted for insertion into the open mouth of the next adjacent section, said sections being insertable through said slit into said space, one of said sheets having an inner surface coated with a reflecting metal, the other of said sheets being transparent, with the transparent sheet being thicker than the other of said sheets, said sheets cooperating to define a pressure chamber, and means for supplying air under pressure to said chamber, whereby the peripheral contracting action of said sheets maintains said reduced extensions rigidly engaged in said mouths.

3. In an inflatable curved mirror, a pair of circular complemental sheets of pliant resilient plastic sealed together at their peripheral edges and along a circular line spaced from their peripheral edges, said sheets being slitted between said seals to provide access to said space, a sectional supporting ring comprising a plurality of rigid arcuate tubular sections each having an open mouth at one end and a reduced extension at the other with the reduced extension on one section being adapted for insertion into the open mouth of the next adjacent section, said sections being insertable through said slit into said space, one of said sheets having an inner surface coated with a reflecting metal, the other of said sheets being transparent, a protective sheet of a pliant resilient plastic arranged on the exterior of the sheet having the reflecting surface, having its peripheral edge sealed thereto and cooperating therewith to provide a protective airspace therebetween, the first two of said sheets cooperating to define a pressure chamber, and means for supplying air under pressure to said chamber, whereby the peripheral contracting action of said sheets maintains said reduced extensions fully engaged in said mouths.

References Cited in the file of this patent

UNITED STATES PATENTS

| 504,890 | Ohmart | Sept. 12, 1893 |
| 2,798,478 | Tarcici | July 9, 1957 |
| 2,836,101 | Swart | May 27, 1958 |
| 2,952,189 | Pajes | Sept. 13, 1960 |

FOREIGN PATENTS

| 112,065 | Sweden | Oct. 10, 1944 |
| 1,145,474 | France | Oct. 25, 1957 |